United States Patent

[11] 3,629,560

| [72] | Inventor | Kenneth Leonard Slawson |
| --- | --- | --- |
| | | Depew, N.Y. |
| [21] | Appl. No. | 831,131 |
| [22] | Filed | June 6, 1969 |
| [45] | Patented | Dec. 21, 1971 |
| [73] | Assignee | Houdaille |
| | | Buffalo, N.Y. |

[54] APPARATUS FOR CONTROLLED DECELERATION IN NUMERICAL POSITIONING
8 Claims, 17 Drawing Figs.

[52] U.S. Cl. .................................................. 235/151.11,
318/570, 318/571, 318/574
[51] Int. Cl. .................................................. G06f 15/46,
G05b 15/00
[50] Field of Search .......................................... 235/151.1,
151.11; 318/561, 570, 571, 574; 340/172.5

[56] References Cited
UNITED STATES PATENTS

| 3,109,974 | 11/1963 | Hallmark .................... | 318/571 |
| --- | --- | --- | --- |
| 3,204,132 | 8/1965 | Benaglio et al. ............ | 235/151.11 X |
| 3,344,260 | 9/1967 | Lukens ...................... | 235/151.11 |
| 3,482,155 | 12/1969 | Fredriksen ................. | 318/561 |
| 3,486,012 | 12/1969 | Burnett et al. .............. | 235/151.11 |

Primary Examiner—Malcolm A. Morrison
Assistant Examiner—Felix D. Gruber
Attorney—Hill, Sherman, Meroni, Gross & Simpson ABSTRACT: A control system wherein a supervising computer is operable to observe acceleration and deceleration characteristics of the particular control system and then to compute optimum deceleration points with respect to subsequent commands to the system on the basis of the observed characteristics and to initiate deceleration of the system at the optimum points in executing the successive commands to the system.

INVENTOR.
Kenneth L. Slawson

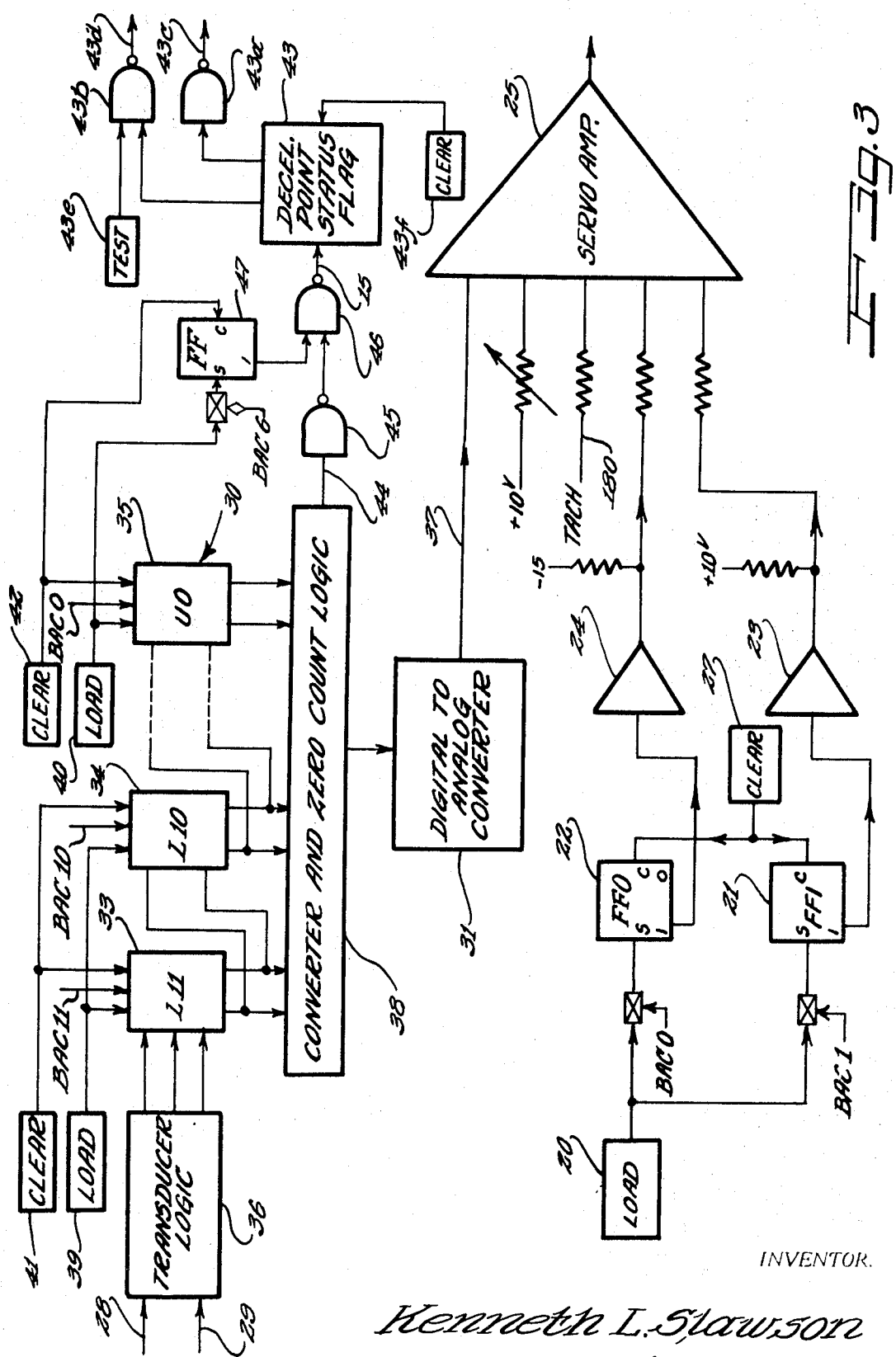

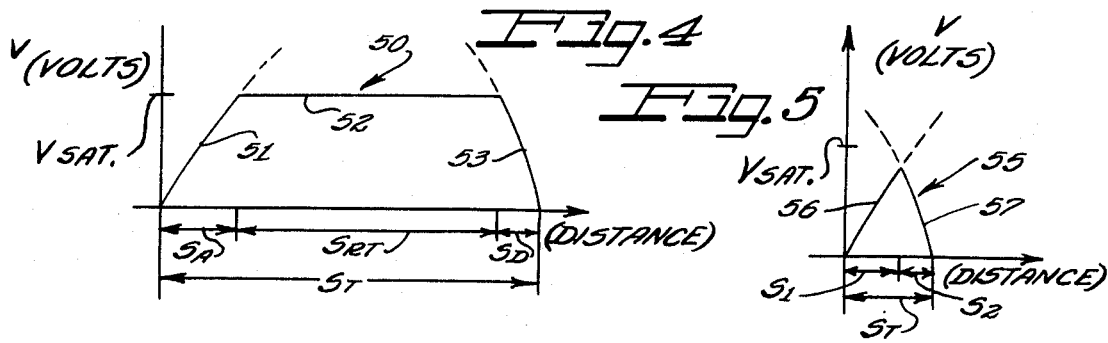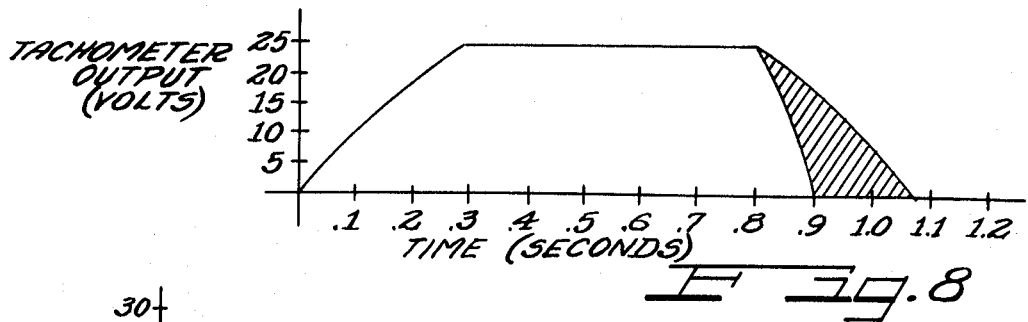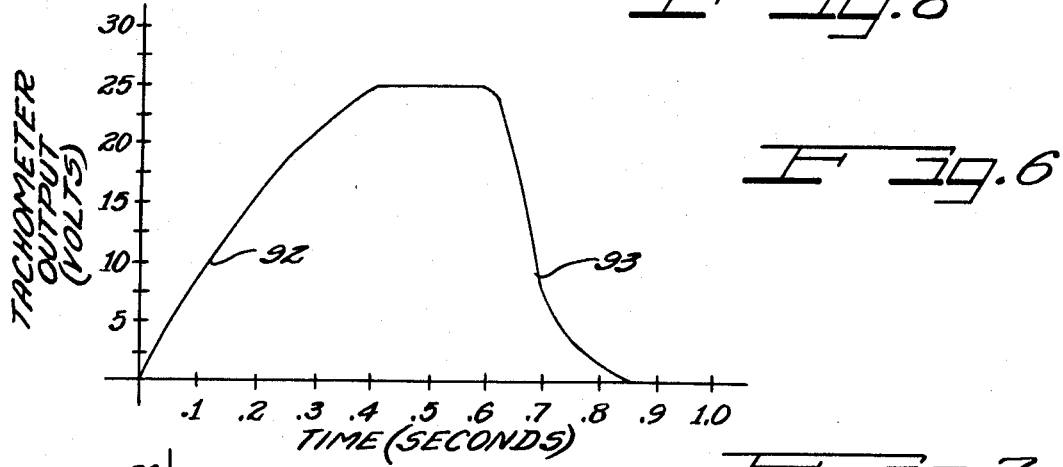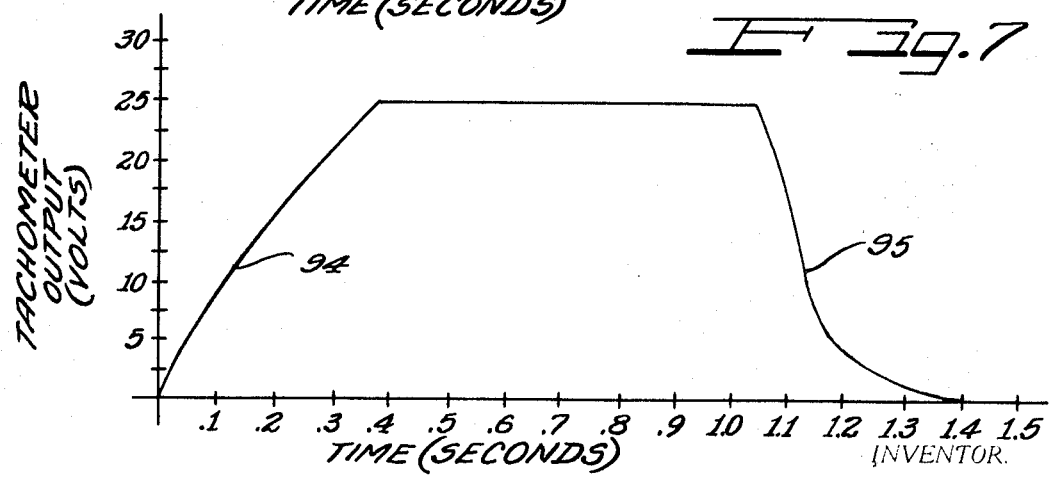

INVENTOR.
Kenneth L. Slawson 3,629,560

APPARATUS FOR CONTROLLED DECELERATION IN NUMERICAL POSITIONING

CROSS REFERENCES TO RELATED APPLICATIONS

The overall system of the present disclosure may correspond to that of my copending applications, Ser. No. b 652,968 filed July 12, 1967 (now abandoned) and Ser. No. 744,392 filed July 12, 1968, and the disclosures of each of these applications is hereby incorporated by reference in its entirety.

SUMMARY OF THE INVENTION

The present invention relates to a control system and method capable of determining its own individual characteristics such as acceleration and deceleration times and distances under given conditions and capable of automatically utilizing such observed characteristics in the optimum execution of subsequent commands to the system.

The invention also relates to methods and apparatus for deriving acceleration and/or deceleration characteristics for a given control system for subsequent use in adjusting the operation of the control system in response to successive commands.

It is an object of the present invention to provide a control system capable of providing more nearly optimum operation in executing a series of commands.

It is another object of the invention to provide a control system which may be adapted to the particular characteristics of a given load with which it is associated.

Another object of the invention is to provide a control system which may readily be retuned from time to time so as to maintain more nearly optimum operating conditions during the life of the system.

Still another and further object of the present invention is to provide a control system capable of automatically determining its own current operating characteristics at desired intervals and for thereafter taking into account any changes in such operating characteristics in executing future commands to the system.

A more specific object of the present invention is to provide a control system having a supervising digital computer which is capable both of determining the operating characteristics of the particular system and of utilizing such observe characteristics to determine a substantially optimum deceleration point for the system in executing successive commands.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 3 is a schematic diagram illustrating still a further portion of a control system in accordance with the present invention;

FIG. 4 is a graphical illustration of the response of the control system for the case of a relatively long move;

FIG. 5 is a graphical representation of the response of the control system for the case of a relatively short move;

FIG. 6 is a graphical representation of the operating characteristic of a typical numerical control system or a 2.000-inch move;

FIG. 7 is a graphical illustration of the response characteristics of the numerical control system for a 4.000-inch move;

FIG. 8 is a graphic illustration showing the improved results obtained with the control system of the present invention;

DESCRIPTION OF THE PREFERRED EMBODIMENT

Figure 1:
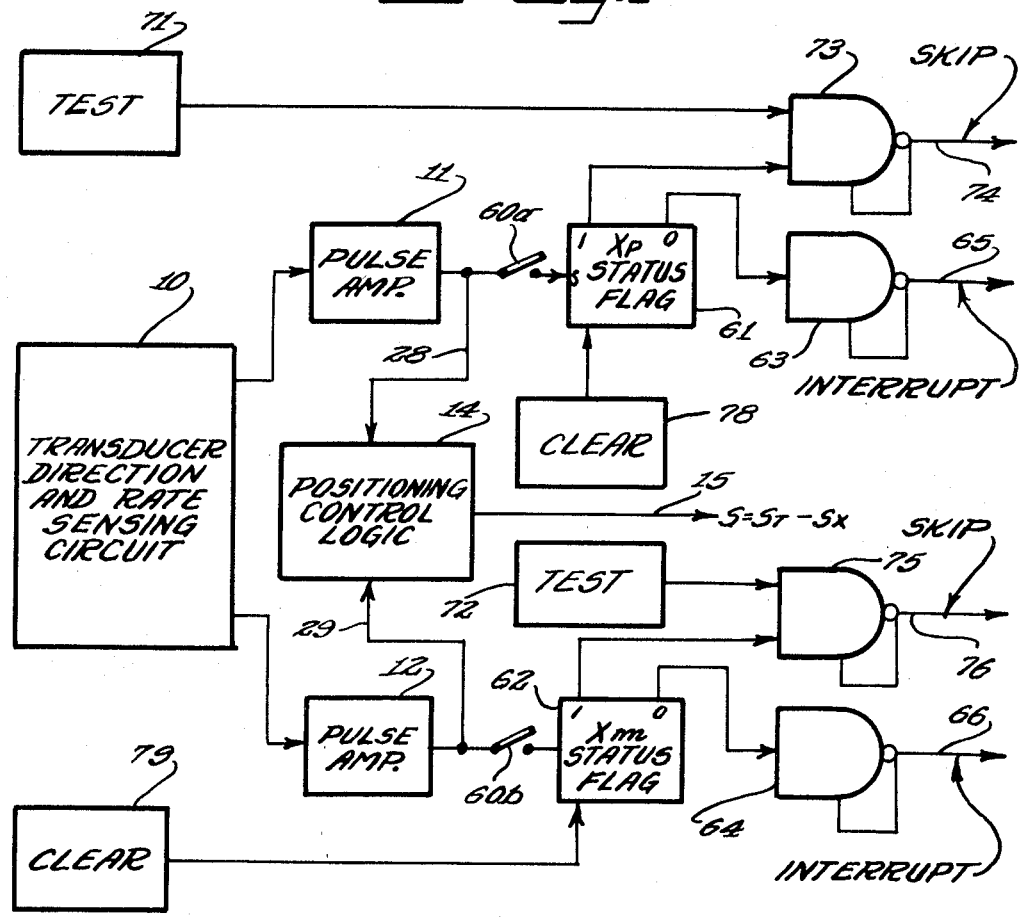
FIG. 1 is a schematic diagram illustrating a portion of a control system in accordance with the present invention.

FIG. 1 illustrates a portion of a control system in accordance with the present invention. By way of example, the system may be utilized to control successive punching operations of a punch press such as disclosed in my pending applications, Ser. No. 652,968 and Ser. No. 744,392. A specific transducer direction and rate sensing circuit corresponding to component 10 of FIG. 1 is illustrated in the fourth FIG. of said copending applications, and the overall control system is illustrated in the sixth FIG. of such copending applications. During a positioning operation of such a control system, motion along the X-axis for example results in a series of motion produces at the output of pulse amplifier 11 or pulse amplifier 12, depending on the direction of such motion. As illustrated in detail in the copending applications, the outputs of the pulse amplifiers 11 and 12 are supplied to positioning control logic as represented by component 14 in FIG. 1. The positioning control logic 14 includes a bidirectional counter (indicated at 30 in FIG. 3) whose initial count is set by means of a computer as illustrated in the copending applications. With the present embodiment, however, the counter is loaded with a binary number equal to the commanded distance of movement along the axis, $S_T$, less an optimum deceleration distance $S_X$. The positioning control logic 14 is utilized to emit a signal at output line 15 when the distance S traversed by the load with respect to the given axis is equal to the total commanded distance $S_T$ minus the optimum deceleration distance $S_X$.

Referring to FIG. 3 of the present application the illustrated control system has provision for a command from the computer to move at a rapid traverse rate either in a positive direction or a negative direction with respect to the given axis. Thus for a commanded movement in the positive direction (from punched tape, for example), the input BAC 1 from the computer may be at a logical one level, while for a negative displacement command the computer may place the line BAC 0 at the logical one level. Thereafter, the computer selects component 20, FIG. 3, so as to set flip-flop 21 for a positive command or flip-flop 22 for a negative command. For a positive command, driver 12 is activated from the set output of flip-flop 21, while for a negative command, driver 24 is activated from the set output of flip-flop 22. The resulting positive or negative current flow to servoamplifier 25 is of a magnitude to saturate the amplifier with the desired polarity so as to drive the associated axis components at a maximum rate in the desired direction.

When the computer receives the deceleration point signal via line 15, FIG. 1, the computer actuates the clear selector component 27, FIG. 3, so as to transmit a clear signal to the flip-flops 21 and 22 removing the previous energizing input to the servoamplifier 25. Contemporaneously, the computer loads into the reversible binary counter 30, FIG. 3, an appropriate binary number corresponding to the optimum stopping distance $S_X$ together with a sign bit in accordance with the polarity of the input command. The reversible binary counter 30 continues to receive the motion pulses from pulse amplifier 11 or 12 (via line 28 or 29, FIGS. 1 and 3) so that now the counter 30 will count down toward zero as the load approaches the commanded end position. If the load should overshoot slightly, counter 30 will begin counting up with opposite polarity in the same way as described for the reversible counter of the prior applications.

Since the prior applications have disclosed in detail a reversible binary counter such as counter 30 with a substantial number of stages including a plurality of input stages such as stages 33 and 34 in FIG. 3, and a sign representing stage such as stage 35, the representation of the counter 30 in FIG. 3 will be sufficient. It will be understood from the applications that the counter 30 is actuated by the count pulse output from amplifier 11 or 12, FIG. 1, via conductor 28 or 29 and transducer logic 36, FIG. 3, and will progressively count down as the load approaches the commanded position. The counter 30 provides a linear analog output from converter 31 over a range of positive and negative error counts in the vicinity of zero, and the linear range has a sufficient extent to cover any possible overshoot of the system in either direction of travel. The action of the converter 31 and servoamplifier 25 within the linear error range will correspond to that explained in detail in the copending applications. The same reversible binary counter 30 is preferably utilized both for obtaining the deceleration point signal at line 15 and for providing the control of converter 31 thereafter. The analog signal at the output 37 from converter 31 prior to the occurrence of the deceleration point signal is not detrimental since amplifier 25 is saturated at this time. The converter and zero count logic component 38 is utilized to control the digital to analog converter 31 so as to provide a linear output as a function of error count as shown in the 14th and 15th FIGS. of the copending application, Ser. No. 744,392.

Referring to FIG. 3, the computer is considered as controlling load selector components 39 and 40 and clear selector components 41 and 42 so that the counter stages such as 33-35 can be cleared and then have the desired optimum deceleration count inserted therein as determined by the levels applied to the computer output conductors such as indicated at BAC 0, BAC 10 and BAC 11.

The deceleration point signal at line 15 serves to set a deceleration point status flag flip-flop 43, FIG. 3, which controls NOR-gates 43a and 43b having output lines 43c and 43d to the interrupt bus and skip bus of the computer. Also test and clear selector components 43e and 43f are provided to enable the computer to determine that the deceleration point interrupt signal has occurred and to enable the computer to thereafter remove the interrupt signal from the deceleration point status flag flip-flop 43.

Referring to FIG. 3, the means for generating the deceleration point signal at line 15 has been indicated. Specifically the output line 44 from component 38 corresponds to the $\overline{\text{X Zero}}$ output line (1445) in the 14th FIG. of the copending application, Ser. No. 744,392. This line 44 supplies a positive going signal when the count in counter 30 equals zero, which signal is inverted by component 45. The resultant negative going signal at the input to NOR-gate 46 is transmitted to line 15 providing a control flip-flop 47 has been placed in a set condition during loading of counter 30. The computer will set flip-flop 47 when loading the value $S = S_T - S_X$, but will leave the flip-flop 47 reset when loading the value $S_X$ into the counter.

In the illustrated system, which may utilize the digital computer described in detail in the copending applications, it is necessary to determine a desired value of deceleration distance $S_X$ so as to enable the computer to compute the deceleration point S equals $S_T$ minus $S_X$ where $S_T$ represents the total desired distance of movement along the axis under consideration.

For the case of a relatively long move as represented in FIG. 4, the operation of the control system may be represented by curve 50. The curve 50 includes an acceleration portion 51 where speed is progressively increasing, a rapid traverse portion 52 where speed is relatively constant and a deceleration portion 53 where speed is decreased to zero. Where a tachometer provides an output of voltage as a function of speed, this output voltage is measured to provide the ordinate in the graphical representation of FIG. 4. From FIG. 4, it will be observed that the load moves a distance $S_A$ as it accelerates from rest to the rapid traverse speed. Similarly, the load moves a distance $S_D$ as it decelerates from the rapid traverse speed essentially to the rest condition. The distance the load travels at the rapid traverse speed is represented by the symbol $S_{RT}$ in FIG. 4, and the total distance travelled is represented by $S_T$. The voltage from the tachometer while the load is travelling at the rapid traverse speed is indicated by the symbol $V_{SAT}$ in FIG. 4.

The other case of interest is that where the distance to be travelled $S_T$ is sufficiently short so that the load does not attain the rapid traverse speed. This is represented in FIG. 5 by the curve 55 including an acceleration portion 56 and deceleration portion 57. Where the ordinate in FIG. 5 is the tachometer output voltage, it will be observed that the curve does not reach the saturation output voltage $V_{SAT}$. In this event the distance (hereinafter designated $S_1$) travelled during acceleration of the load will be less than the distance $S_A$ of FIG. 4, and the distance (hereinafter designated $S_2$) which the load travels during deceleration will be less than the deceleration distance $S_D$ of FIG. 4. Thus the computer must determine a distance $S_X$ which will be equal to $S_D$ in the case of a movement where rapid traverse speed is attained as in FIG. 4, and which will be equal to $S_2$ in the event that rapid traverse speed is not attained, for example as represented in FIG. 5.

In the preferred embodiment in accordance with the present invention, the control system is itself operable to determine its own operating characteristics from which the value $S_D$ or $S_2$ can be computer with reference to each input command to be executed by the control system.

Figure 2:
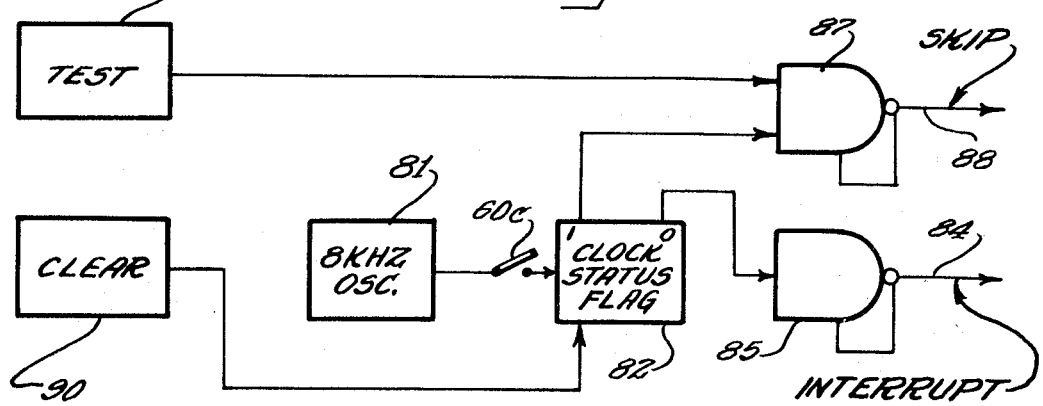
FIG. 2 is a schematic diagram illustrating another portion of a control system in accordance with the present invention.

For the purpose of enabling the control system to determine the necessary parameters, certain components are included in the system as indicated in FIGS. 1 and 2. Simply by way of example selector switch contacts 60a, 60b (FIG. 1) and 60c (FIG. 2) are shown which are closed manually or under computer control when the control system parameters are to be observed. Referring to FIG. 1, status flag flip-flops 61 and 62 are provided for coupling to the outputs respectively of pulse amplifiers 11 and 12. Thus, status flat 61 will be set by each count pulse produced by a positive increment of movement of the load, and status flat 62 will be set in response to each count pulse representing a negative increment of movement of the load. NOR-gates 63 and 64 are shown coupled to respective outputs of the flip-flops 61 and 62 so as to supply an interrupt signal at output line 65 or 66 for signalling the computer then successively tests selector components such as 71 and 72 to determine the cause of the interrupt signal. For example if flag component 61 is in set condition, NAND-gate 73 will be enabled, and a "SKIP" signal will be transmitted from selector 71 to output line 74 leading to the computer. Similarly, if flag component 62 is in set condition, NAND-gate 75 is enabled so that the signal from selector component 72 will be transmitted as a SKIP signal at output line 76. When the computer has determined the cause of the interrupt condition, the computer actuates the corresponding clear selector component 78 or 79 so as to reset or clear the flag component which was in the set condition.

This logical structure of FIG. 1 enables the computer to observe the successive count pulses and to determine the polarity of such pulses during its testing of the control system to determine its operating characteristics.

FIG. 2 illustrates circuit components which enable the timing of certain test operations on the control system. These components may include, for example, an 8-kilohertz oscillator component 81, and a clock status flag flip-flop 82. So long as switch contact 60c is closed flip-flop 82 will be set at intervals for 125 microseconds, causing an interrupt signal to be supplied to the computer via line 84 from NOR component 85. With the status flag component 82 in set condition, NAND-gate 87 is enabled so as to transmit a SKIP signal to output line 88 when the computer activates the associated test selector component 89. When the computer determines that the clock status flag component 82 is the cause of the interruption, the computer will then activate the associated clear selector component 90 so as to clear the clock status flag component 82. Thus the circuit of FIG. 2 enables the computer to observe and count a series of clock pulses to provide a time base to its observation of the operating characteristics of the control system.

Having outlined the general characteristics of a preferred embodiment of the present invention, the background considerations, details of practical mechanization, and operation of the system will now be discussed.

DISCUSSION OF THE ILLUSTRATED CONTROL SYSTEM

The following criteria were adopted in order to generate the desired control technique: (1) the control system should be general in nature so that it could apply to any machine tool, (2) the control system should have the ability to adapt to a change of characteristics, and (3) it should be capable of tolerating unlimited controllable overshoot in positioning to a given coordinate. Two primary problems which had to be solved in implementing the new concepts were: (1) how to determine the proper point to begin the deceleration, and (2) what procedure should be followed if the desired move did not allow the machine tool to achieve rapid traverse.

An exact solution to determine the deceleration point would involve defining and solving simultaneous first order differential equations such that the total move was the sum or partial sum of the accelerating distance ($S_A$), the rapid traverse distance $S_{RT}$) and the deceleration distance ($S_D$). (See FIG. 4).

The primary object to this procedure is the time and equipment necessary to perform the task which is predicated on an exact knowledge of the system parameters.

Another way of obtaining the necessary information is to use on-off deceleration control by means of a small general purpose digital computer, such as described in the copending applications. The benefits realized being that: (1) a digital computer determines the deceleration point, not an arbitrary factory adjustment, (2) the computer may be used to close the control loop, thus saving hardware cost, and (3) numerical programming effort can be significantly reduced by using the computer as a combination calculator and tape preparation facility.

The digital computer, through the use of a previously stored program, can determine the proper deceleration point by experimentally interrogating the machine tool and measuring the acceleration distance ($S_A$) and deceleration distance ($S_D$). These experimentally derived values would then be available either for use by the computer or by external hardware to position the machine tool. The advantage of using a computer to accomplish this task is that it can be repeated either periodically or at any time at the discretion of the operator, should machine tool characteristics change because of equipment replacement of load change, or should the control system be applied to other unrelated machine tools.

There are two possible conditions to be considered in trying to determine the deceleration boundary:

Case 1, $S_T \geq S_A + S_D$ (see FIG. 4). The first case is where the machine tool is required to stop in minimum time and where the point to point move is greater than or equal to the sum of the accelerating and decelerating distances $S_A$ and $S_D$. Nominally this sum is less than 1 inch. In this condition the machine tool is traveling at the same constant speed independent of the size of the move and the distance required to stop using maximum deceleration is fairly constant, deviations being nonlinearities in the machine tool. Therefore, for the case where the desired move ($S_T$) is $\geq (S_A + S_D)$ the computer merely begins the move and waits until the remaining distance is less than or equal to $S_D$; then at this point the machine tool is commanded to stop, using maximum deceleration.

Case 2, $S_T < S_A + S_D$ (see FIG. 5). The second case involves a condition where the desired move ($S_T$) read from punched tape is less than the sum of the accelerating and decelerating distances. In this case the deceleration point is dependent on the size of the proposed move. Actual graphical recordings, typified by FIGS. 6 and 7, show the machine tool's output response in relation to condition of Case 2. Because of the dynamics of the system, the acceleration and the deceleration curves 92 and 93, FIG. 6, and 94 and 95, FIG. 7, may be approximated by parabolas which are substantially linear near the principal axis. Because of this observation an approximation was made which greatly simplifies the calculation of the deceleration point for various size moves. The approximation assumes the slope of the acceleration and deceleration curves near the principal axis to be linear. Based on this assumption, the following result can be derived for the deceleration distance, $$S_2 = S_X = \frac{S_T}{1 + \frac{K_1 + 2K_2}{K_2}}$$

where $K_1$ and $K_2$ are the slope approximations for acceleration and deceleration as a function of time, such that $V_{SAT} = K_1 t_1 = K_2 t_2$ where $t_1$ is the time required for the load to accelerate to rapid traverse speed, and $t_2$ is the time required for deceleration essentially to a rest condition from such speed. The deceleration slope $K_2$ is larger than $K_1$ because of the presence of output damping in the present control system, and this tends to improve overall response by permitting faster deceleration when compared to systems with no output damping.

The preferred control system has the advantage of being used not only to determine acceleration and deceleration characteristics but also to position the machine tool. The positioning loop is comprised of six major components, namely (1) digital transducers, (2) a decoder and pulse generating network, (3) a digital computer, (4) digital to analog converters, (5) a servoamplifier, and (6) a DC drive motor.

The specific components employed in the system are described as follows (with reference numerals in parenthesis referring to the present drawings where appropriate).

Digital Transducers—Digital position feedback is available in the form of discrete pulses from a Trump Ross rotary transducer connected to the carriage leadscrew. The transducers provide two amplified square wave pulse trains, each being fifty counts per revolution shifted 90° out of phase. The direction of travel and linear count pulses must be obtained by properly decoding the information presented by the transducers.

Decoding Network—FIG. 1 illustrates two control lines 28 and 29 which are used to signal the control system as to the direction and amount of movement in positioning to a given coordinate. The direction of travel is determined by the ordered sequence in which the pulses from the transducer are observed. A device which will operate as a pulse decoder appropriately is designed as type-R601 and is manufactured by the Digital Equipment Corporation. In order to operate, a ground level must precede a pulse change to ground by 400 nanoseconds; this provides an ideal decoding network when connected, as shown in the 4th FIG. of the pending applications. Positive pulses appear at the output of one R601 amplifier (11, FIG. 1), while negative pulses appear at the output of the other R601 amplifier (12, FIG. 1). Since every leading or trailing edge of the transducer output generates a unique pulse, 200 pulses are generated per revolution of the leadscrew, producing on pulse for every one thousandth of an inch of linear travel.

Digital Computer—A general purpose PDP8/S digital computer, also manufactured by the Digital Equipment Corporation, is specified to be used in the control loop, to (1) sample the actual system in order to determine the deceleration, and (2) to actually provide appropriate signals to control point to point positioning.

Digital To Analog Converter—The purpose of the digital to analog converter (31, FIG. 3) is to accept discrete digital signals from the computer or an external register (e.g. counter 30, and logic 38, FIG. 3), and to provide an appropriate analog voltage to be used as an input by the servoamplifier (25, FIG. 3). The specified component for this operation is an A601 digital to analog converter, also manufactured by the Digital Equipment Corporation.

Servo Amplifier—The component specified (25, FIG. 3) is manufactured by Hughes Industrial Controls and is the same type as that used in Hughes numerical controls. It is a half-wave SCR amplifier having a gain of approximately 150 which saturates at an output voltage of 75 volts. The amplifier receives input signals from the digital to analog converter (31, FIG. 3) and is capable of providing 400 volts-amperes.

DC Drive Motor—The horsepower and speed depend on the particular machine tool considered. In the case of a Strippit Fabramatic 30/30, a General Electric one-sixth-horsepower shunt-wound motor can be used. The motor is made for half-wave operation and requires 75 volts for the armature, 50 volts for the field and runs at a speed of 1,725 r.p.m. at these stated conditions.

FIG. 1 shows a portion of the hardware necessary to interface a machine tool to a PDP8/S digital computer, both for the purpose of determining machine tool characteristics and to assist in closing the control loop. Transducer pulses are shaped and reduced to standard logic levels through the use of two W501 Schmitt triggers whose outputs are used by R601 pulse decoders. The R601 pulse amplifiers 11 and 12 control two status flag flip-flops 61 and 62, which are used to interrupt the computer by applying a ground on the interrupt bus, (via output line 65 or 66), every 0.001 inch of linear travel. The computer, upon receiving an interrupt, jumps to an interrupt service routine whereby it will begin testing interface hardware according to a previously determined priority. This testing is accomplished by the computer giving a signal through a device selector W103 (such as 71 or 72) to external hardware, and if the device being tested caused an interrupt, a signal will be present on the computer skip bus (from conductor 74 or 76), and the next sequential program instruction will be skipped.

FIG. 3 illustrates the method the computer uses to provide inputs to the servoamplifier 25 in order to position the machine tool. The gain of the servoamplifier is adjusted so that a display of one count in the error register 30 produces a DC voltage at the output of the digital to analog converter 31 which causes a minimum movement to make a correction. Thus, when the system is running under a rapid traverse condition, the servoamplifier 25 receives a command input only from Digital Equipment Corporation W050 or W601 drivers 23 or 24. When the deceleration point ($S=S_T-S_X$) has been reached and the rapid traverse input has been removed, the system is decelerated rapidly. Final positioning is under the control of the error count supplied to the digital to analog converter (31).

Maintaining closed loop control once the rapid traverse input has been removed involves the use of A601 digital to analog converter stages (manufactured by Digital Equipment Corporation). A problem that arises when using the converter is how to obtain linearity when the count changes from a plus one count (00......1) to a minus one count (11......1) and vice versa, remembering that the computer operated in 2's complement arithmetic. This is solved by proper application of the position count to the digital to analog converter. Thus the most significant stage (35) of the converter displays the negation of the sign bit, which normally is the most significant bit of the error display register. It is this last connection which allows a bias voltage to be summed with the converter output to produce a linear voltage change when the error register changes polarity.

Using this technique provides a linear mode of operation for small errors when used with the on-off deceleration control concept.

OPERATION TO DETERMINE MACHINE TOOL CHARACTERISTICS

Figures 9A, 9B:
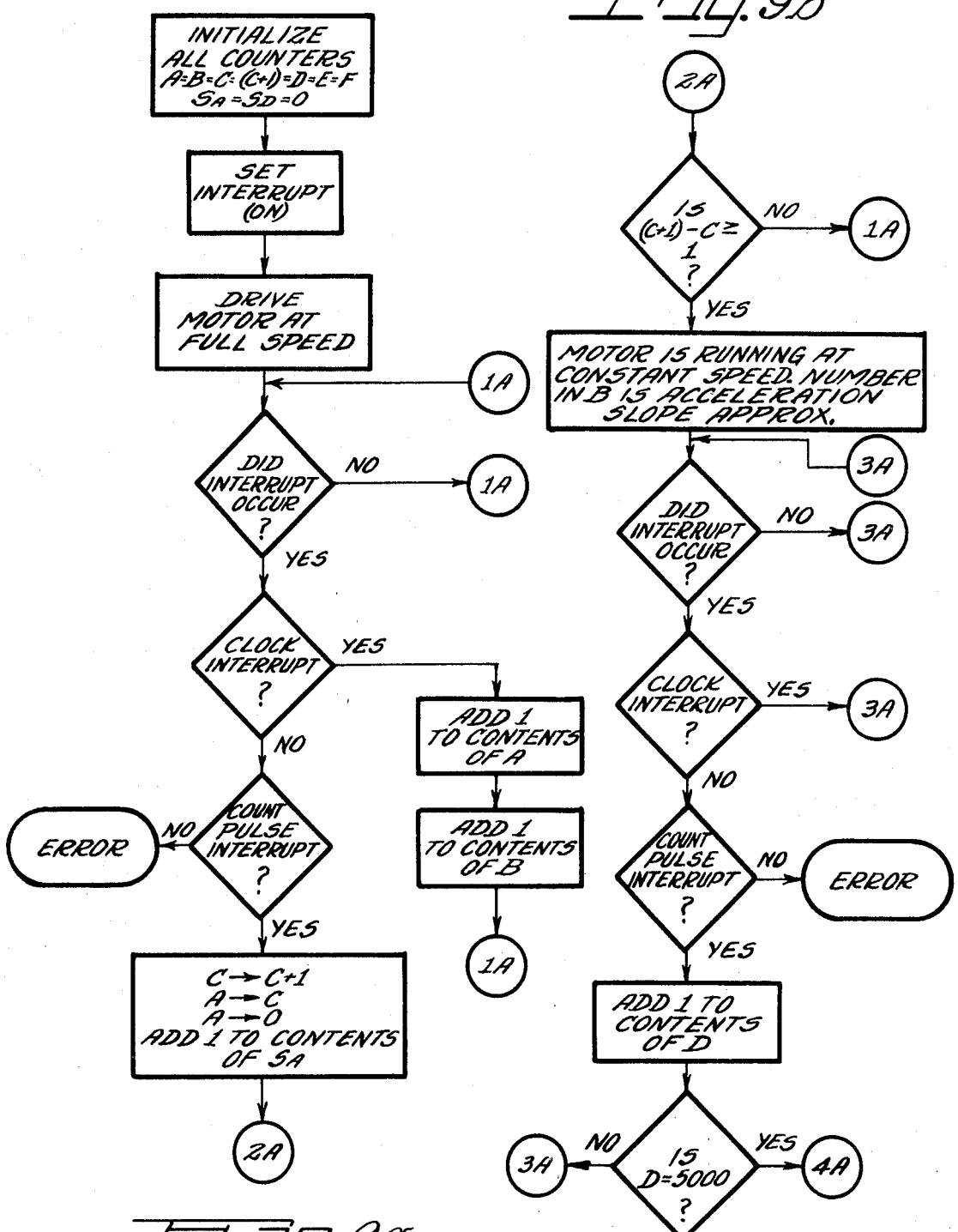
FIG. 9 consisting of FIGS. 9a, 9b and 9c is a flow diagram illustrating the determination of acceleration and deceleration characteristics for the control system.

FIG. 9 is a flow diagram used in the experimental determination of machine tool characteristics. The scheme employs the use of an interrupt system such as that used by the PDP8/S digital computer. In addition to a machine tool and required interface, the computer needs a digital clock (81, FIG. 2) with a frequency of approximately 8 kilohertz.

At the start of a test calculation, the computer initializes all the internal counters, turns on the interrupt system, closes switches 60a, 60b and 60c, and applies a voltage to the servoamplifier 25 sufficient to drive the motor at full speed. The computer then waits for a clock or count pulse program interrupt. Upon receiving interrupts, clock pulses occurring between count pulses are stored in computer memory locations (C) and (C+1) where a comparison is made to determine if any two-count pulse intervals occur within one clock pulse of each other. If so, the machine tool is assumed to be transversing at constant maximum transverse speed. At this point counter B in the computer memory will contain the number of clock pulses, and counter $S_A$ (acceleration distance will contain the number of count pulses to achieve rapid traverse speed, and the machine tool will make a move of 5.000 inches before beginning deceleration.

During deceleration, the total number of clock pulses to stop is stored in memory location F, and counter $S_D$ (deceleration distance) will contain the number of count pulses to complete deceleration. At this point the test is completed and the machine tool is assumed at rest if no count pulse occurs for approximately 2.5 seconds or 20,000 clock pulses.

It is a matter of routine to prepare a computer program in accordance with FIG. 9 to carry out the test and determine the necessary information to use on-off deceleration control.

OPERATION OF THE CONTROL SYSTEM OF FIGS. 1 AND 3 TO CONTROL DECELERATION

The flow diagram represented in FIG. 10 shows how a system according to FIG. 3 could be controlled using the previously determined information. The decision process is extremely simple once the machine tool characteristics are known. The computer merely reads a position coordinate from previously prepared punched tape, and determines if the proposed move will cause the carriage to attain a rapid traverse speed. If so (see FIG. 4), the motor is driven at full speed until the remaining distance to the objective is equal to $S_D$ (deceleration distance), then the carriage is stopped as quickly as possible by removing the rapid traverse input and allowing the converter 31 to complete positioning should a small overshoot or undershoot occur. If the required command move is less than the distance needed to attain full speed (see FIG. 5), the computer will compute the distance away from the command position where the input must be reduced to zero in order to minimize positioning time by solving the equation $$S_2 = S_X = \frac{S_T}{1+\frac{K_1+2K_2}{K_2}} \text{ where}$$

$K_1$ and $K_2$ equal the contents of B and F storage locations previously defined.

A reasonable and good approximation of the savings to be realized by using the on-off deceleration control was obtained by recording the tachometer response with respect to time on a Brush recorder. FIG. 8 shows an example of the typical results obtained. First, data was obtained showing the acceleration and deceleration times for positioning to various size moves using conventional deceleration methods. Then, while the machine tool was running at a rapid traverse speed, the servocommand input was reduced to ground potential and the results recorded. Using this simple procedure provides a rather good insight into what can be expected when the on-off deceleration control method is fully implemented.

The results of this test showed that the on-off deceleration control reduced the deceleration time by approximately 60 percent when compared with conventional methods. Reflected in the overall time to position and punch a hole, a Strippit Fabramatic 30/30 could punch 80 holes per minute on 1-inch centers, as opposed to 60 holes per minute which presently results from using conventional methods of controlling deceleration.

It should also be remembered that since a digital computer is used in the control loop, deceleration is not an arbitrary tuning procedure, but it is uniquely adapted to individual machine tools, always readily available in the form of a computer program. Normal usage would include (1) initial installation, (2) periodic checking, should machine tool characteristics change, or (3) application of the control system to other machine tools.

ALTERNATIVE EMBODIMENTS

As an alternative to the system heretofore described, the computer could use its own core memory as a counter $S_T$ to store the distance remaining to the commanded end point i.e. ($S_T$–S). The computer would then decrease the stored count by one each time a count pulse interrupt signal appeared at the count interrupt output line 65 or 66, FIG. 1. When the stored count reached $S_X$, the computer would load the count $S_X$ into the stages of counter 30, which would then count down in response to count pulses directly as heretofore described.

As a further alternative counter 30 could be used as a register which is set to successively reduced counts by the computer in response to count pulse interrupt signals at 65 or 66, after the counter is loaded with the value $S_X$.

Figure 10B:
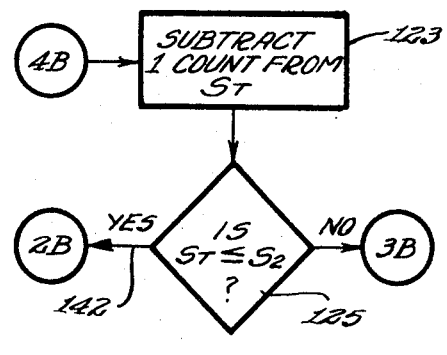
FIG. 10 consisting of FIGS. 10a, 10b and 10c and FIG. 11 consisting of FIGS. 11a and 11b are flow diagrams showing exemplary control logic for determining a more nearly optimum deceleration point in executing successive commands to the system.
Figure 10C:
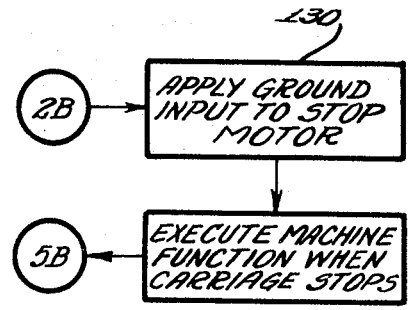
Figure 10A:
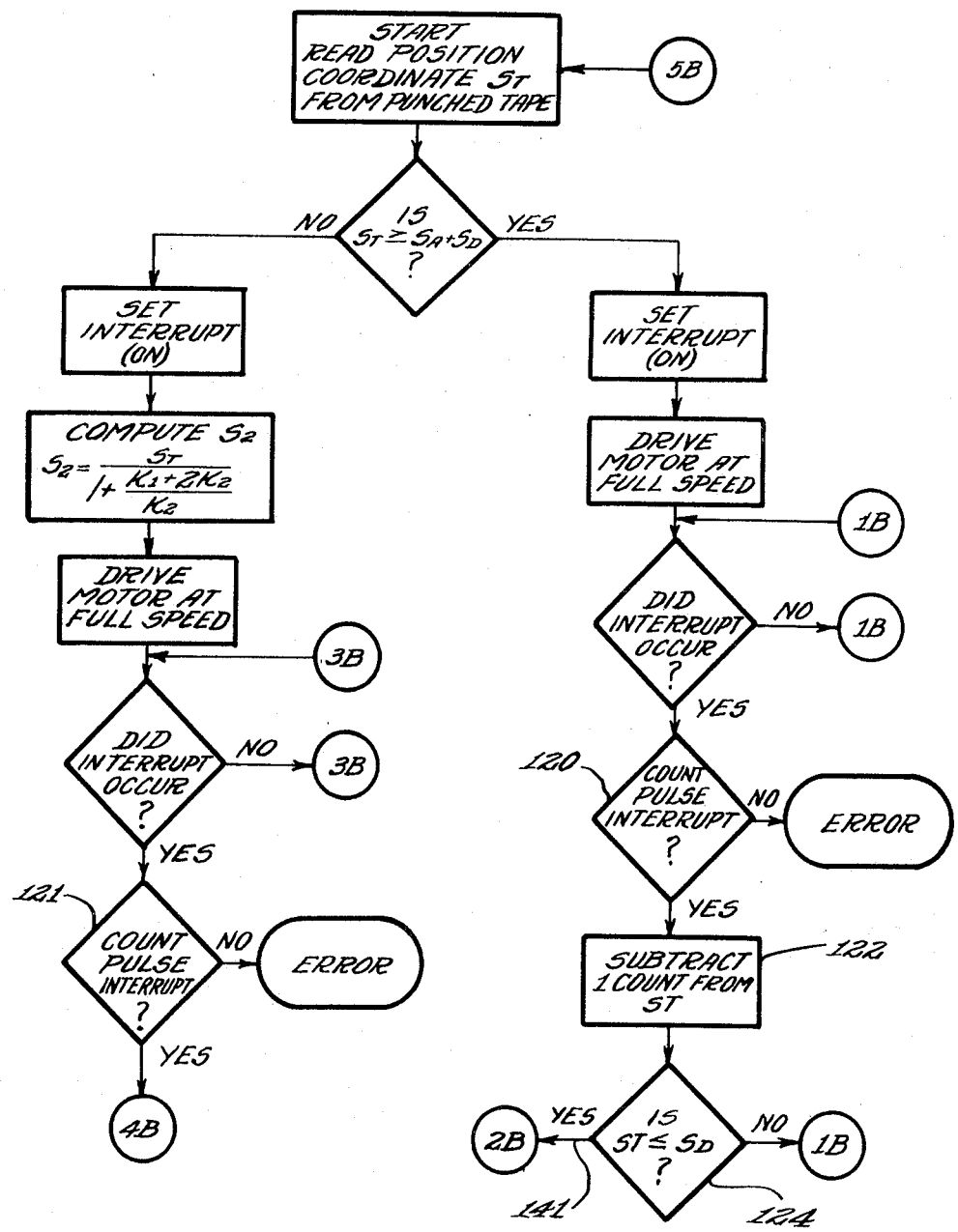

The blocks 120 and 121, FIG. 10a, and the blocks 122, FIG. 10a, and 123, FIG. 10b (found on sheet No. 5 of the drawings along with FIG. 10c), apply for the example where the computer core memory is used as a register $S_T$ to store a count value $S_T$–S. When using the hardware shown in FIG. 3, these program steps are omitted and the decision steps of blocks 124, FIG. 10a and 125, FIG. 10b, involve an interrogation of test selector 43, FIG. 3.

The executive steps represented by block 130, FIG. 10c (found on sheet No. 5 of the drawings), would include loading of $S_X$ ($S_2$ or $S_D$) into the binary counter 30, FIG. 3, where the hardware of FIG. 3 is utilized to count transducer pulses directly.

FIG. 11 shows an alternative to the operation indicated in FIG. 10c, and has been specifically drawn to illustrate operation where the computer uses its core memory as a counter $S_T$ to accumulate a count value equal to the remaining displacement $S_T$–S, of the axis from its position at the beginning of a move. In this case the steps of blocks 120–123 of FIG. 10 would be included.

Figures 11A, 11B:
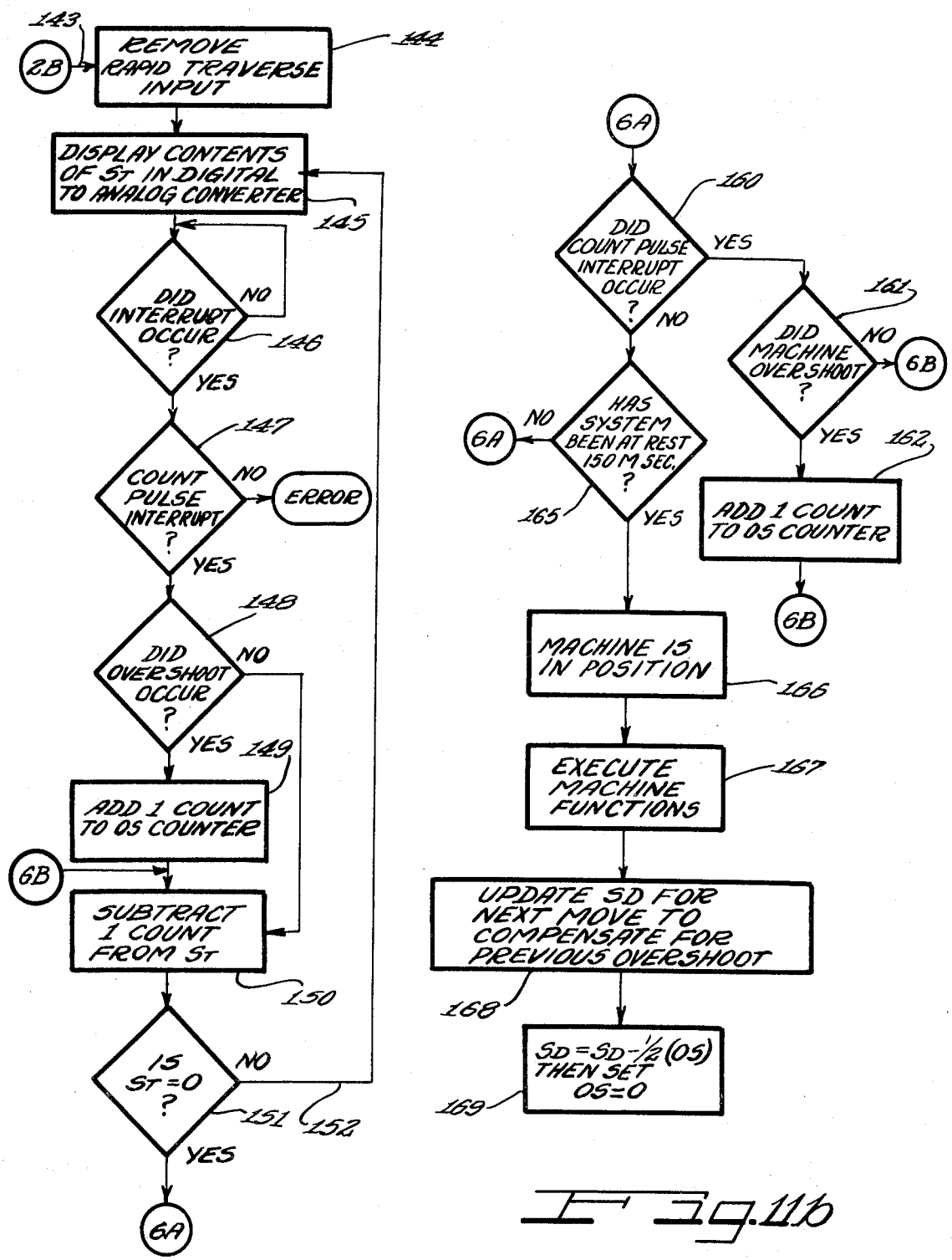

For operation as represented in FIGS. 11a and 11b, switches 60a and 60b, FIG. 1, would be closed, and switch 60c, FIG. 2 would be open. The counter 30 would operate as a register, and switches (not shown) in lines 28 and 29, FIGS. 1 and 3, would be opened so that the counter would not respond to transducer pulses directly. Flip-flop 47, FIG. 3, would remain in the reset condition so that status flag flip-flop 43 could not be actuated to set condition. In carrying out the function of decision block 124, FIG. 10a, or 125, FIG. 10b, the computer would simply compare the count stored in its register $S_T$ with the value $S_D$ or $S_2$ also stored in its core memory. When the count in the register $S_T$ was equal to the stored value $S_D$ or $S_2$, the computer would begin executing the steps represented in FIGS. 11a and 11b. This is indicated by the use of the circle with the character 2B therein at the output flow lines 141 and 142 of decision blocks 124 and 125, FIGS. 10a and 10b, and at the input flow line 143 to function block 144, FIG. 11a.

The step of block 144, FIG. 11a, would be executed by the computer by actuating the clear selector 27, FIG. 3. Block 145, FIG. 11a would be executed by transferring the contents of register $S_T$ to the various stages of counter 30, FIG. 3. As represented by components 146 and 147 in FIG. 11a, an interrupt would occur only with the setting of status flag flip-flops 61 or 62, FIG. 1.

The function of block 148, FIG. 11a, may be carried out by having the computer determine if the count in register $S_T$ has previously passed through zero. (See blocks 151, 160 and 161 whose mechanization will be described hereinafter.)

In block 149, the computer would respond to an overshoot pulse by adding an absolute value of one to a register OS in the computer core memory. In carrying out block 150, the computer would subtract a count from the register $S_T$. More particularly component 150 serves to add each count pulse to register $S_T$ in accordance with its polarity so that the register maintains an algebraic count at all times in accordance with the displacement of the load from the commanded end point, even when the load has overshot the commanded end point. (This can be done since the computer can determine whether status flip-flop 61 or 62, FIG. 1, has been actuated to represent the count pulse.)

Having reference to block 151, FIG. 11a, it will be noted that the procedural steps of FIG. 11a are repeated as indicated by flow line 152 until the count registered by the computer in register $S_T$ is zero, at which time control moves to the sequence of FIG. 11b.

Referring to block 160, FIG. 11b, it will be noted that in the event of a further count pulse, control is transferred to the block 161 to determine if the count pulse following the condition $S_T$=0 has the polarity of the command being executed. If the polarity reflects movement in the commanded direction, the pulse would constitute an overshoot pulse. For the particular logic illustrated, it may be assumed that once an overshoot has occurred, the computer will store this fact and answer the interrogation at block 161 and at block 148 in the affirmative throughout the remainder of the positioning cycle. Also the observation of an overshoot condition by the computer will cause overshoot pulses to be registered as negative counts (i.e. as counts of opposite polarity) in register $S_T$. For example if the register $S_T$ initially is counting down from a given positive displacement value overshoot pulses will be registered as negative values in 2's complement notation. Any count pulses occurring after the overshoot will be registered in the OS register of the computer core memory regardless of whether the count pulse results from movement in the overshoot direction or in the return direction. Thus, the actual value of the overshoot will be equal to one-half the final value registered in the location OS of the computer memory. The counter 30 will be controlled during an overshoot so as to register successive counts representing the overshoot just as though it were responding directly to transducer pulses.

From block 162, FIG. 11b, control passes to block 150 whereby the further count is algebraically applied to the previous count of the register $S_T$. Thus after a first overshoot pulse the count in register $S_T$ will be a value of one with a polarity opposite to the polarity of the initial count value applied to this register. Since $S_T$ is equal to one, control now passes via flow line, 152, FIG. 11a, back to block 145, with further count pulses being applied as absolute values to the OS counter as indicated by block 149, and being applied algebraically to the register $S_T$ as indicated by block 150.

The illustrated logic assumes that there will not be an oscillation about the end point value once an overshoot has occurred. Of course, oscillation after an overshoot could be taken into account by algebraically applying counts to the OS register as well as to the $S_T$ register. Once the load returns to the commanded end point and $S_T$ is again equal to zero, it may be assumed that the logic will follow the path 160, 165–169. The operation of block 165 may be performed by means of components such as illustrated in the eighteenth FIG. of application Ser. No. 744,372, now U.S. Pat. No. 3,586,286.

With the system of FIG. 11, the computer corrects the value of $S_D$ after each move so as to correct it for any changes in the operating characteristics of the particular machine tool with which the computer is associated. Where the initial command has been less than the sum $S_A+S_D$, the blocks 168 and 169 may represent the correction of future values of $S_z$ so as to tend to eliminate overshoot for example by an appropriate modification of the constant $K_z$ stored by the computer. Any desired formula may be used for computing adjusted values of $S_z$ and $S_D$ to insure that a stable optimum adjustment will be maintained for a given machine tool.

With respect to each of the embodiments, it will be understood that the maximum output from the digital to analog converter 31 is far less than the output from driver 23 and 24. Further, a speed-responsive tachometer is connected to line 180, FIG. 3, and this tachometer will supply a feedback voltage when the rapid traverse movement of the load is interrupted which feedback voltage will be sufficient in many cases to saturate the amplifier 25 with a reverse polarity current so as to provide very rapid braking action or "plugging" on the drive motor. Normally, the accuracy of the system is such that the digital to analog converter 31 need comprise only a relatively few stages, so that the linear range of the converter will correspond to error counts in the vicinity of zero. For example, the linear range of the converter would correspond to error counts of less than plus or minus 16.

DETAILED DISCUSSION OF THE IMPLEMENTATION OF FIGS. 1-3

By way of summary of the relationship between the components of FIGS. 1-3 and the disclosure of the aforementioned copending application, Ser. No. 744,392 filed July 12, 1968, the following tabulation is presented.

| Component of present application | Corresponding components of Serial No. 744,392 |
|---|---|
| Transducer direction and rate sensing circuit 10, FIG. 1 (page 3, lines 6-8). | Components of FIG. 4, including 112, 400-403, and input gates 421, 422, 441, 442, 451, 452, 461, 462. |
| Pulse amplifiers 11 and 12, FIG. 1 (page 3, lines 10-13). | Pulse amplifiers 404, 405, FIG. 4. |
| Positioning control logic 14, FIG. 1 (page 3, lines 16-18). | Components of FIG. 4 including 406-415, 426, 428, and outputs $\overline{XM}$, X-CLOCK, and $\overline{XP}$; components of FIGS. 1A and 1B including XLII-XLO and XUII-XUO; and circuitry of FIG. 14 leading to conductor 1445, $\overline{X}$ ZERO. (The stored program digital computer, FIG. 37, has output 200, FIG. 2, for setting the initial count in XLII etc.) |
| Transducer logic 36, FIG. 3 (page 5, lines 1-5). | Components of FIG. 4 including 406-415, 426, 428, and outputs $\overline{XM}$, X CLOCK, and $\overline{XP}$. |
| Counter 30, FIG. 3 (page 4, line 26 to page 5, line 5). | Components XLII-XLO and XUII-XUO, FIGS. 1A and 1B. |
| Stage LII at 33, FIG. 3 (page 4, line 28). | Stage XLII, FIG. 1A. |
| Stage LIO at 34, FIG. 3 (page 4, line 28). | Stage XLIO, FIG. 1A. |
| Converter and zero count logic 38, FIG. 3 (page 6, lines 7-9). | Components of FIG. 14 leading to $\overline{X}$ ZERO conductor 1445, FIG. 14. |
| Digital to analog converter 31, FIG. 3 (page 5, lines 17-20). | Components of FIG. 15 leading to conductor 1538, FIG. 15. |
| Load components 20, 39, 40, FIG. 3; Clear components 27, 41, 42, 43f, FIG. 3, 78, 79, FIGS. 1, and 90, FIG. 2; and Test components 71, 72, FIGS. 1, 89, FIGS. 2, and 43e, FIG. 3. | Device selectors such as 101, FIG. 1A, which are commercially available. |

A programming example for control of the hardware of FIGS. 1 and 3 is described in the section hereof entitled "Operation of the Control System of FIGS. 1 and 3 to Control Deceleration" and wherein it is stated that when using the hardware shown in FIG. 3, certain program steps of FIG. 10 are omitted, and the decision steps of blocks 124 and 125 involve an interrogation of test selector 43e, FIG. 3.

As previously indicated herein with respect to FIG. 9, it is a matter of routine to prepare a computer computer program in accordance with the flow diagrams of FIGS. 9-11 to carry out the desired sequence of operation as described with respect to the hardware of FIGS. 1-3. The implementation of the desired sequences of operation will be facilitated by a reference to the exemplary program details found in the copending application, Ser. No. 744,392. Under these circumstances, it is considered that the required modifications of the program of application, Ser. No. 744,392 to operate the hardware of FIG. 1 and 3 will be apparent to those skilled in the art from the present disclosure, so that further discussion herein would tend to obscure the present invention rather than to provide a clear and concise description thereof as required by the Patent Statute.

DESCRIPTION OF FIG. 12

Figure 12:
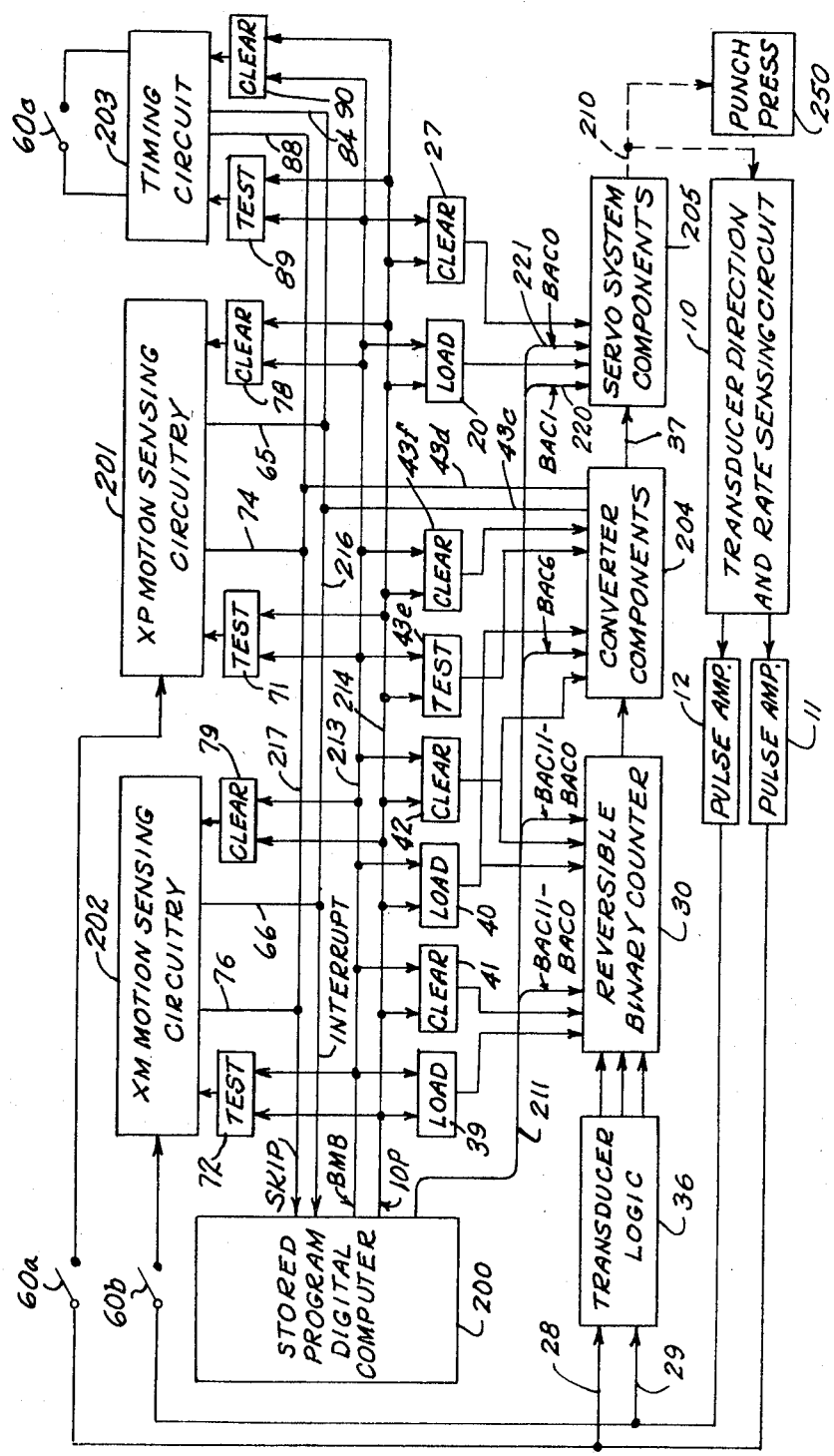
FIG. 12 is a block diagram of the overall system including the circuits of FIGS. 1–3.

FIG. 12 shows the overall system including stored program digital computer 200 and the circuitry of FIGS. 1-3 (with corresponding reference numerals being applied to identical parts). Certain components of FIG. 12 include several parts of FIGS. 1-3 considered as a unit, and such components of FIG. 12 are correlated with parts of FIGS. 1-3 as follows:

| Component of FIG. 12 | Corresponding Parts of FIGS. 1-3 |
|---|---|
| XP Motion Sensing Circuitry 201 | XP Status Flag 61, FIG. 1, and gates 63 and 73, FIG. 1 |
| XM Motion Sensing Circuitry 202 | XM Status Flag 62, FIG. 1 and gates 64 and 75, FIG. 1 |
| Timing Circuit 203 | Oscillator 81, FIG. 2, Clock Status Flag 82, FIG. 2, and gates 85 and 87, FIG. 2 |
| Converter Components 204 | Converter and Zero Count Logic 38, FIG. 3, Digital to Analog Converter 31, FIG. 3; gates 43a, 43b, 45 and 46, FIG. 3, and flip-flop 47, FIG. 3, and status flag 43, FIG. 3 |
| Servosystem Components 205 | Flip-Flops 21, 22, FIG. 3, drivers 23, 24, FIG. 3, Servo Amplifier 25, FIG. 3 |

FIG. 12 illustrates an overall control system in accordance with the present invention. By way of example, the system may be utilized to control successive punching operations on a punch press. By way of example, a mechanical coupling is indicated at 210 in the lower right-hand corner of FIG. 12 which indicates a coupling to components of the punch press which are movable relative to one axis of the machine. Referring to the disclosure of application, Ser. No. 744,392, FIG. 1B, the X-axis servo drive component (111) of application, Ser. No. 744,392 would form part of servosystem components 205 of FIG. 12, and mechanical coupling 210 would correspond to mechanical coupling (198) of application Ser. No. 744,392. During a positioning operation of the control system, motion along the X-axis, for example, results in a series of motion pulses at the output of pulse amplifier 11 or pulse amplifier 12, depending on the direction of such motion. The initial count of bidirectional counter 30 is set by means of the computer 200 by means of a BAC cable 211 (corresponding to cable 130 of application, Ser. No. 744,392). Loading of the lower order stages of counter 30 is effected by selection of load component 39 by means of BMB cable 213 and IOP cable 214 (corresponding to cables 280 and 290, FIG. 2, of application, Ser. No. 744,392). With the present embodiment, however, the counter 30 is loaded with a binary number equal to the commanded distance of movement along the axis, $S_T$, less an optimum deceleration distance, $S_X$. Converter components 204 include a deceleration point status flat 43 which is set when the distance S traversed by the load with respect to the given axis is equal to the total commanded distance $S_T$ minus the optimum deceleration distance $S_X$. At this instant, an interrupt signal is applied to conductor 43c leading to interrupt bus 216 of computer 200 (corresponding to interrupt bus 1120, FIGS. 11 and 37, of application, Ser. No. 744,392). Actuation of test component 43e, FIG. 12, causes a signal to be transmitted via conductor 43d and Skip bus 217 of computer 200 (corresponding to Skip bus 1121, FIGS. 11 and 37, of application, Ser. No. 744,392).

The control system of FIG. 12 has provision for a command from computer 200 to move at a rapid traverse rate either in a positive direction or a negative direction with respect to the given axis. Thus for a commanded movement in the positive direction (from punched tape, for example), the input conductor BAC 1 of cable 211, and designed 220 in FIG. 12 may be at a logical one level, while for a negative displacement command, the computer 200 may place the line BAC 0, and designated by reference numeral 221 in FIG. 12, at the logical one level. Thereafter the computer selects by means of cables 213 and 214 load component 20, FIG. 12, so as to actuate components 205 as previously described with respect to flip-flops 21 and 22, FIG. 3. When the computer receives the deceleration point signal, the computer actuates the clear selector component 27, FIG. 12, by means of cables 213 and 214, so as to remove the previous energizing input in servosystem components 205. Contemporaneously, the computer loads via cable 211 into the reversible binary counter 30 an appropriate binary number corresponding to the optimum stopping distance $S_x$ together with a sign bit in accordance with the polarity of the input command. The reversible binary counter 30 continues to receive motion pulses from pulse amplifier 11 or 12 via lines 28 or 29 and transducer logic 36, FIG. 12, so that the counter 30 will now count down toward zero as the load approaches the commanded end position. Referring to FIG. 12, the computer 200 is considered as controlling load selector components 39 and 40 and clear selector components 41 and 42 by means of cables 213 and 214, so that the counter 30 can be cleared and then have the desired optimum deceleration count inserted therein as determined by the levels applied to the computer output conductors of cable 211.

In the preferred embodiment in accordance with the present invention, the control system of FIG. 12 is itself operable to determine its own operating characteristics from which the values of $S_x$ (which will be equal to $S_D$ in the case of movement where rapid traverse speed is attained as in FIG. 4, and which will be equal to $S_2$ in the event that rapid traverse speed is not attained, for example as represented in FIG. 5) can be computed with reference to each input command to be executed b the control system.

For the purpose of enabling the control system to determine the necessary parameters, components 201–203 are provided. Simply by way of example selector switch contacts 60a, 60b, FIG. 12, and 60c, FIG. 2, within timing circuit 203, are shown which are closed manually or under computer control when the control system parameters are to be observed. Interrupt line 65 from circuitry 201, FIG. 12, is activated for each count pulse produced by a positive increment of movement of the load, while interrupt line 66 from circuitry 202 will be activated in response to each count pulse representing a negative increment of movement of the load. The computer then successively tests selector components such as 71 and 72 to determine the cause of the interrupt signal. For example, if circuitry 201 produced the interrupt signal, a SKIP signal will be transmitted from test selector 71, causing a SKIP signal at output line 74 leading to the SKIP bus 217 of computer 200. Similarly, if circuitry 202 caused the interrupt signal, the signal from selector component 72 will be transmitted as a SKIP signal at output line 76 leading to the SKIP bus 217. When the computer 200 has determined the cause of the interrupt condition, the computer actuates the corresponding clear selector component 78 or 79 so as to reset circuitry 201 or 202.

This logical structure enables the computer to observe the successive count pulses and to determine the polarity of such pulses during its testing of the control system to determine its operating characteristics. The timing circuit 203 enables the timing of certain test operations of the control system. The timing circuit 203 provides an interrupt signal at output line 84 in response to each clock pulse from the 8-kilohertz oscillator 81, FIG. 2. The circuit 203 thus enables the computer 200 to observe and count a series of clock pulses to provide a time base to its observation of the operating characteristics of the control system.

SUMMARY OF THE OPERATION

In operation of the overall system of FIG. 12, the first step is to determine the deceleration characteristics of the parts of the specific punch press 250 which serve as a load with respect to the given path of movement (e.g. the X-axis) along which the servosystem components 205 drive the parts of the punch press.

Figure 9C:
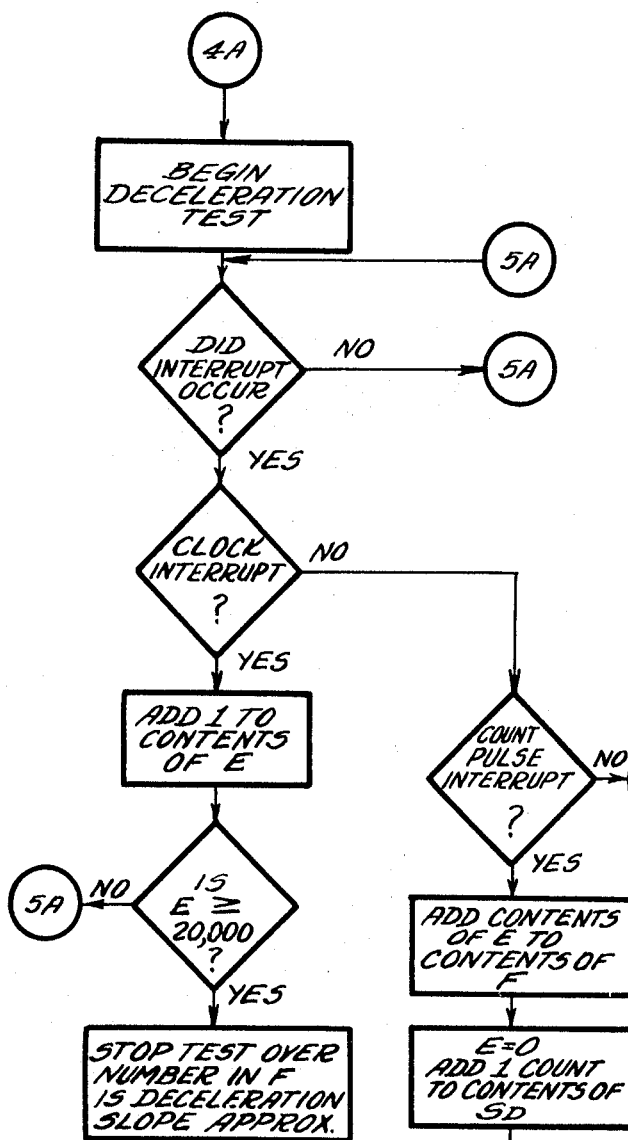

As described previously under the heading Operation to Determine Machine Tool Characteristics, the computer closes switches 60a, 60b and 60c and applies voltage to servoamplifier 25 sufficient to drive the load 250 at full speed. FIG. 9c indicates the computer program of computer 200 which is operative after the load is accelerated to the full speed condition.

During deceleration, the total number of clock pulses to stop is stored in memory location F, and counter $S_D$ (deceleration distance, FIG. 4) will contain the number of count pulses to complete deceleration. At this point the test is completed and the machine tool is assumed at rest if no count pulse occurs for approximately 2.5 seconds or 20,000 clock pulses from clock 81, FIG. 2. This determination is made by the computer under the control of the program of FIG. 9c. The resulting value of $S_D$ is the load positioning control quantity indicative of deceleration characteristics of the load which is thus automatically present in the computer memory at the end of the program operation represented in FIG. 9c. The values of acceleration distance $S_A$, FIG. 4, acceleration slope $K_1$, and deceleration slope $K_2$ correspond to the contents of counter $S_A$ of the computer memory, FIG. 9a, the contents of counter B, FIG. 9a, and the contents of counter F, FIG. 9c, respectively, which values $S_A$ $K_1$ and $K_2$ are also automatically present in the computer memory at the end of the program operation of FIGS. 9a, 9b and 9c.

For the case of a subsequent command of the type represented in FIG. 4, $S_T$ (from punched tape) is greater than the sum of $S_A$ plus $S_D$ (the values of $S_A$ and $S_D$ being stored in computer memory), so that the value of $S_x$ is taken as that stored at $S_D$.

The computer program is such that when $S_T \geqq S_D + S_A$, the value $S_T$ minus $S_D$ is loaded into the binary counter 30 as described with reference to FIG. 12. The interrupt signal at 43c, FIGS. 3 and 12, then causes the computer 200 under the control of its stored program to load the value $S_D$ itself into counter 30 and to remove the full speed drive by actuation of clear selector 27, FIGS. 3 and 12. This type of computer operation is analogous to that illustrated in detail in application, Ser. No. 744,392, so that illustration of the program therefor by way of flow diagrams is unnecessary.

A more sophisticated alternative program which uses counter 30 as a register and uses a register $S_T$ in computer memory, is illustrated in FIGS. 10a, 10b, 11a and 11b.

In this alternative mode of operation, the program of FIGS. 11a and 11b causes the computer to respond to load movement signals such as produced at lines 65 and 66, FIG. 1, during a given move to generate a valve OS (Block 149, FIG. 11a) which is used to modify the load positioning control quantity $S_D$ when the load departs from the optimum deceleration movement pattern as shown in FIG. 4. The modification of $S_D$ is represented in blocks 168 and 169, FIG. 11b.

SUMMARY OF THE ALTERNATIVE EMBODIMENT OF FIGS. 10 AND 11

As described herein the blocks 120 and 121, FIG. 10a, and the blocks 122, FIG. 10a, and 123, FIG. 10b, apply for the example where the computer core memory is used as a register $S_T$ to store a value corresponding to the distance remaining to the commanded end point.

As indicated by block 124 of FIG. 10a and block 125 of FIG. 10b, the computer would determine internally when the time had arrived to remove the rapid traverse input. Thus for the example of FIG. 4, when the computer register $S_T$ contained a value equal to or less than the distance $S_D$, FIG. 4, the rapid traverse input is removed to begin deceleration as represented by curve 53, FIG. 4. Similarly in the instance of FIG. 5, when the value in the computer register $S_T$ was equal to or less than the distance $S_s$, FIG. 5, the rapid traverse input would be removed to provide for deceleration as represented by curve 57.

As explained previously in the description of FIG. 11, the counter 30, FIG. 3, would operate as a register, and once the rapid traverse input is removed as represented by block 144, FIG. 11a, the step of block 145 is effected by displaying the contents of the computer register $S_T$ in the counter 30 so that the counter 30 controls the converter logic and digital to analog converter components 38 and 31, FIG. 3.

Thereafter, the digital to analog converter components would control the positioning of the load at the commanded end point.

As represented by blocks 145–151, each count pulse causes one count to be subtracted from the computer register $S_T$ (block 150) after which the contents of the register $S_T$ is displayed in the counter 30 (as indicated by block 145 and return line 152, FIG. 11a).

When the value in the computer register $S_T$ reaches zero (block 151, FIG. 11a), the computer is controlled as represented in FIG. 11b. Thereafter, a count pulse interrupt represents a machine overshoot (see block 161, FIG. 11b), and each such overshoot causes a count of one to be added to a counter OS (block 162). As represented as blocks 165–169, after the machine has reached its end position and has been at rest for 150 milliseconds, a new deceleration distance $S_D$ is inserted into computer memory which is equal to the value set forth in block 169, FIG. 11b. Thus, the value of the deceleration distance stored in the computer memory is adjusted so as to tend to eliminate overshoot of the load in a subsequent move.

I claim as my invention:

1. A machine-tool-control system comprising
   a stored program digital computer for receiving a series of input displacement commands specifying successive movements of parts of a machine tool serving as a load along a given path of movement, said computer including a computer memory for storing a computer program and for storing a load-positioning control quantity, said computer program being operable to control the stored program digital computer to generate displacement control signals based on the respective input displacement commands and modified to take into account said load-positioning control quantity, said stored program digital computer under the control of said program being responsive to load movement signals with respect to each move and being operable to modify said load-positioning control quantity when the positioning of the load departs from a predetermined movement pattern and being operable to modify said load-positioning control quantity in a sense tending to correct for such departure, and
   a machine tool control operatively connectable to the machine tool to control movement of the parts of the machine tool serving as said load along the given path of movement, and operatively connectable to said stored program digital computer to respond to said displacement control signals to move the load along said path at a schedule of speeds as a function of distance such as to cause the load to substantially follow said predetermined movement pattern in the successive movements of said load, and to supply to said stored program digital computer said load movement signals indicative of any departure from the load from said predetermined movement pattern.

2. A machine-tool-control system comprising
   a stored program digital computer for receiving a series of input displacement commands specifying successive movements of parts of a machine tool serving as a load along a given path of movement; said computer including a computer memory for storing a first computer program operable to control the computer to generate first control signals, said stored program digital computer under the control of said first computer program being responsive to load movement signals with respect to each move to determine deceleration characteristics of the load and to store a load positioning control quantity indicative of said deceleration characteristics of the load in said computer memory; said computer memory being operable for storing a second computer program operable to control the computer to generate second control signals based on said input displacement commands and taking into account said load positioning control quantity; and
   a machine tool control operatively connectable to the machine tool to control movements of the parts of the machine tool serving as said load along the given path of movement; and operatively connectable to said stored program digital computer to respond to said first control signals to cause movement of the load at a predetermined speed along said given path and then to cause rapid deceleration of said load; and operable to generate said load movement signals in accordance with the deceleration characteristics of the load when the load is moved under the control of said first control signals, thereby enabling the computer under the control of said first computer program to determine the value of said load-positioning control quantity; and operable to respond to said second control signals to move the load along said path at a schedule of speeds as a function of distance so as to execute the series of input displacement commands and to initiate deceleration of the load at substantially an optimum deceleration point in each successive movement of the load.

3. A machine-tool-control system comprising
   a stored program digital computer for controlling movement of parts of a machine tool serving as a load along a given path of movement; said computer including a computer memory for storing a computer program operable to control the computer to generate movement control signals, said stored program digital computer under the control of said computer program being responsive to load movement signals with respect to movement of said load to determine a deceleration distance in which the load comes to rest from a rapid traverse condition wherein the load is moving at a predetermined speed, and to store said deceleration distance in said computer memory; and
   a machine tool control operatively connectable to the machine tool to control the speed of movement of the parts of the machine tool serving as said load along the given path of movement; and operatively connectable to said stored program digital computer to respond to said movement control signals to cause movement of the load at said predetermined speed along said given path and then to cause deceleration of said load; and operable to generate said load movement signals during deceleration of the load, thereby enabling the computer under the control of said computer program to determine and store in said computer memory the value of said deceleration distance.

4. A machine-tool-control system comprising
   a stored program digital computer receiving an input displacement command specifying a movement of parts of a machine tool serving as a load along a given path of movement to a commanded end point; said computer including a computer memory for storing a first computer program, and said stored program digital computer under the control of said stored program digital computer under the control of computer first computer program being operable to generate first control signals including a rapid transverse signal and a deceleration signal, said stored program digital computer under the control of said first computer program being responsive to load movement pulses to determine the distance of movement of the load and to determine when the load has come to a stop, and being operable to determine and store in said computer memory a deceleration distance equal to the distance required for the load to come to a stop from rapid traverse movement thereof; said computer memory being operable for storing a second computer program and said stored program digital computer under the control of said second computer program being operable to respond to said load movement pulses and to generate second control signals based on said input displacement command and taking into account said deceleration distance, said second control signals including said rapid traverse signal and said deceleration signal; and a machine tool control operatively connectable to the machine tool to control the speed of movement of the parts of the machine tool serving as a load along the given path of movement; and operatively connectable to said stored program digital computer to respond to said rapid traverse signal to cause acceleration of the load to a rapid traverse speed along said given path and to respond to said deceleration of said load; operable to generate said load movement pulses in accordance with successive increments of movement of the load, thereby enabling the computer to determine and store in computer memory the value of said deceleration distance; said machine tool control being operatively connectable to said stored program digital computer to respond to said second control signals to move the load along said path at a speed as a function of distance so as to execute said input displacement command.

5. A control system in accordance with claim 4 with said stored program digital computer under the control of said first computer program being operable to respond to load movement pulses during acceleration of the load from rest to said rapid traverse speed to compute automatically and to store in said computer memory an acceleration distance equal to the distance required for the load to each said rapid traverse speed.

6. A control system in accordance with claim 5 with the stored program digital computer under the control of said second computer program being operable in response to an input displacement command to determine whether the distance to the commanded end point is less than or greater than the sum of said acceleration distance and said deceleration distance and to initiate deceleration of the load when the load is less than the deceleration distance from the commanded end point and before the load attains said rapid traverse speed where the distance and the deceleration distance.

7. A control system in accordance with claim 4 with said stored program digital computer under the control of said second computer program being operable to register the degree of overshoot of the load with respect to a given commanded movement thereof and to adjust the value of the deceleration distance stored in said computer memory so as to tend eliminate such overshoot in a subsequent move.

8. A machine-to-control system comprising a machine tool having parts thereof movable along a given path of movement and serving as a load which will traverse a given deceleration distance while being brought to a stop after achieving a predetermined speed, a stored program digital computer for receiving a displacement command specifying movement of said parts of said machine tool serving as said load along said given path of movement to a commanded end position, said computer memory for storing a computer program and for storing a deceleration distance value which is a function of the deceleration distance for said load, said computer program being operable to control the stored program digital computer to generate displacement control signals including an acceleration signal, and including a deceleration signal based both on the displacement command to be executed and on said deceleration distance value, said stored program digital computer under the control of said program being responsive to load movement signals with respect to each move and being operable to issue said deceleration signal when the load reaches a distance from said commanded end position substantially equal to said deceleration distance; and a machine tool control operatively connected to said machine tool to control the speed of movement of the parts of the machine tool serving as said load along the given path of movement, and operatively connectable to said stored program digital computer to respond to said acceleration signal to accelerate movement of load, said machine tool control being operable to generate said load movement signals in accordance with the movement of the load toward the commanded end position, thereby to enable said computer to sense when the load is at said distance from the commanded end position substantially equal to said deceleration distance.

* * * * *